May 9, 1961 L. A. RUNTON ET AL 2,983,562
OILLESS NON-CORROSIVE BEARING
Filed May 1, 1958
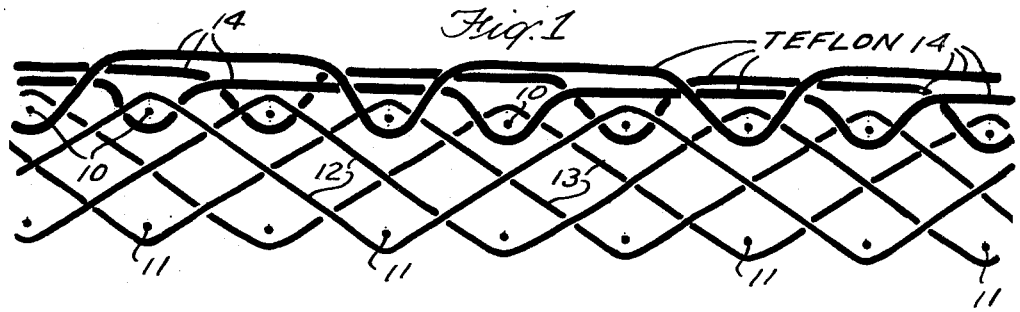
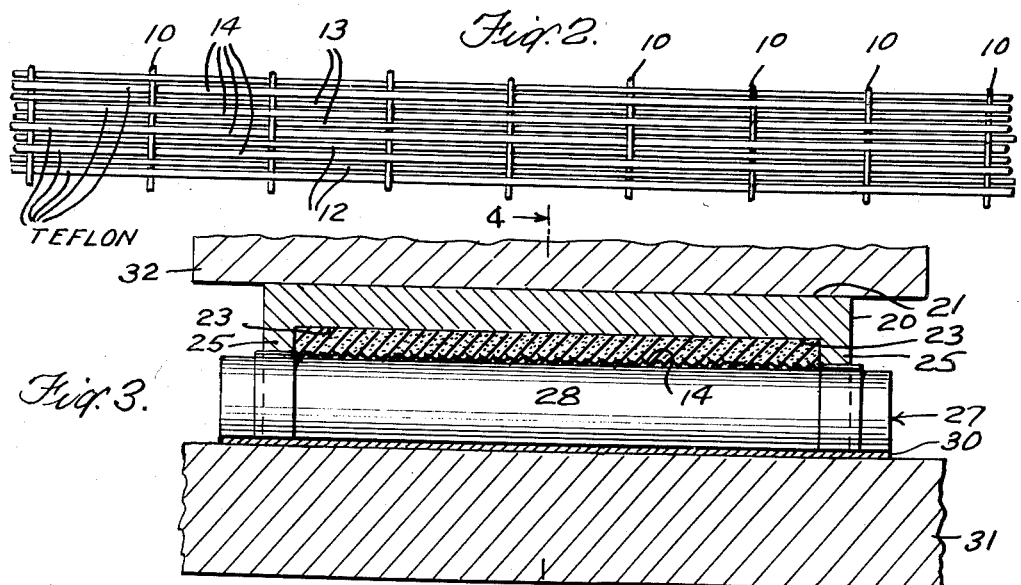
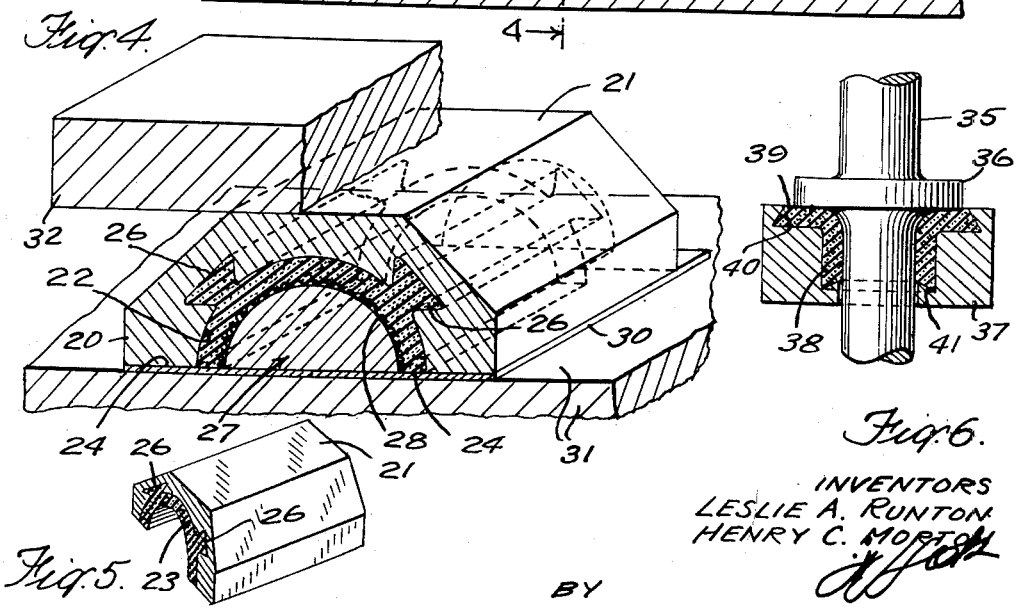
INVENTORS
LESLIE A. RUNTON
HENRY C. MORTON
BY
ATTORNEY

United States Patent Office 2,983,562
Patented May 9, 1961

2,983,562
OILLESS NON-CORROSIVE BEARING

Leslie A. Runton, Middle Haddam, and Henry C. Morton, Branford, Conn., assignors to The Russell Manufacturing Company, Middletown, Conn., a corporation of Connecticut Filed May 1, 1958, Ser. No. 732,302
1 Claim. (Cl. 308—238)

This invention relates to oilless, non-corrosive bearings for heavy duty applications and more particularly to such a bearing for marine use or the like where the parts are subjected to the corrosive influence of salt water or spray.

The invention is particularly applicable to bearings for heavily loaded slow rotating mechanisms such as draw bridges, slucie gates of hydro-electric projects, bearing supports for buckets on cranes, or the like. Also to similar bearings in the marine field, which are subjected to the corrosive action of salt water—such as propeller bearings, rudders, and for the actuating mechanisms on floating man-made islands such as off-shore radar stations, oil rigs where bearing surfaces for elevators and other mechanical equipment are required.

All of these bearings are characterized by being exposed to the weather, having to operate without maintenance over a wide range of temperatures, and being exposed to the elements.

Generally speaking, the coefficient of friction of a normal bearing which would be made of bronze with low friction inserts such as carbon or graphite impregnated with metal powders, would be influenced by the amount of oil and the thickness of this lubricating layer between the bearing and the rotating member. Due to erosion caused by the elements, unless constant maintenance is applied, this oil layer may disappear and the coefficient of friction would be considerably increased which might result in partial destruction of the bearing.

It is the object of this invention to provide a bearing surface which requires no lubrication and would therefore not need constant maintenance, and would not destroy itself if no oil were present. Also, the coefficient of friction is at least as low as that of present bearings of the type described above.

Bearings of this type can not be loaded to any greater degree than the supporting cement around them where bearing pressures in the neighborhood of 1200 pounds per square inch are in force.

In accordance with the present invention a cast stainless steel bearing support is made, so as to provide a recess on the bearing surface side in which woven material is inserted to form the bearing surface through a molding process using time, temperature and pressure.

The shape of the stanless steel casting receiving the woven bearing surface is conventional except that it will have one or more dove tail shaped slots in it which will be filled with fabric and bonded to the bearing surface during the molding operation. This prevents the molded fabric bearing surface from slipping within the stainless steel support casting.

The fabric may be composed of a multi-ply weave using silicate yarns for strength in the basic structure, and Teflon yarns for the exposed surface.

The fabric is woven in such a way that after it is impregnated with phenolic resin and partially dried, it can be put in a suitable mold shaped according to the bearing surface against which it will operate, and compressed in such a manner that the hardness desirable for such heavily loaded bearings is attained. The hardness is in the order of and equal to the hardness of soft cast iron. The compression ratio for such a molding operation may be in the neighborhood of 2½:1. In other words, the fabric after impregnation will have an initial thickness of 2½ times the final thickness.

In the manufacture of bearings for sluice gates for hydro-electric projects, it is sometimes desirable that the bearing not only support a shaft but also act as a thrust bearing. A flange is turned on the shaft and one end of the bearing is flanged outwardly and covered with a Teflon fabric in the same manner as described for the inside bearing surface so that the bearing then acts as a combination thrust and bearing support.

The fabric prior to molding is impregnated with a heat-set, moldable bonding resin such as a phenolic resin or an epoxy resin or a melamine resin which has non-corrosive properties and is settable under heat and pressure to the hardness required.

The bonding resin may be a phenolic resin derived from the reaction of phenol, cresol or a homologue with formaldehyde under controlled conditions or may comprise an epoxy resin. In the drying step the mixture is heated to remove the solvent and the resin content polymerizes until a residual volatile content of 5% to 7% is attained.

The fabric may be molded under heat and pressure. The conversion of the resin into a thermoset form may be accomplished at a temperature of 300° F. to 350° F. for from thirty to sixty minutes at pressures of 10 tons to 100 tons, depending upon the area of the object being molded.

The features of this invention will be better undersood from the following description, taken in connection with the accompanying drawing forming a part thereof in which a specific embodiment has been set forth for purposes of illustration.

In the drawing:

Fig. 1 is a diagrammatic view illustrating the weave of a fabric embodying the invention;

Fig. 2 is a top plan view of the fabric;

Fig. 3 is a longitudinal section through a bearing support and a mold core illustrating the method of molding the bearing;

Fig. 4 is a partial transverse section taken on the line 4—4 of Fig. 3;

Fig. 5 is a broken perspective view of the molded bearing; and

Fig. 6 is a section illustrating a combination thrust bearing made in accordance with the present invention.

Referring to the drawing more in detail the fabric is shown in Fig. 1 as comprising upper and lower rows of filler shots 10 and 11, respectively. The filler shots 10 and 11 are bound together into a woven fabric by two pairs of crossed binder warps 12 and 13 forming double chains. Each double chain passes over alternate filler shots of the two rows and the pairs of chains are offset by one filler shot so as to comprise a unitary weave in which all of the yarns are bound.

The filler shots 10 and 11 and the binders 12 and 13 are composed of a heat-resistant, non-corrosive material such as silicate fibers, i.e., spun glass or quartz fibers.

The bearing surface is formed by multifilament tetrafluoroethylene (Teflon) yarns 14. These yarns 14 are disposed over two filler shots 10 as floats, then under the third filler shot 10 for binding the yarns 14 to the fabric. Three such yarns 14 are woven in groups, mutually displaced by one filler shot to form a twill appearance. Weftwise the binders 12 and 13 are disposed between adjacent yarns 14 as illustrated in Fig. 2.

This fabric is characterized by an anti-friction surface composed of Teflon floats bound mechanically to woven multi-ply backing of a resin bondable material. The Teflon yarns are of larger diameter than the silicate yarns and thus form substantially the entire exposed upper surface.

The fabric bearing is molded in situ onto the surface of a bearing support 20 using the bearing support as a part of the mold as shown in Figs. 3 and 4.

The bearing support 20 is formed with a flat upper surface 21 and with a semi-cylindrical bearing supporting surface 22. The peripheral wall 23 extends circumferentially substantially 180° terminating in surfaces 24 and is formed at its longitudinal ends with annular ribs 25 confining the ends of the bearing element. The surface 22 of the bearing support 20 is provided with longitudinal, dove tail grooves 26 in which the bearing material is secured.

For forming the bearing, strips of resin-impregnated and dried fabric are laid in the grooves 26 and the impregnated and dried fabric of Figs. 1 and 2 is disposed over the surface 22 of the bearing support with the Teflon faced side exposed on the inside. The assembly is then placed over a semi-cylindrical core 27 having a peripheral surface 28 conforming to the surface of the shaft with which the bearing is to be used.

The support 20 and core 27 are then placed on a plate 30 on the bed 31 of a forming press. The upper platen 32 of the press is then actuated to compress the fabric under a predetermined pressure adapted to compact the fabric to the required density. This may involve a reduction in thickness of the order of 2 to 1 or 2½ to 1.

While maintaining this pressure the assembly is subjected to a curing temperature for a time to cure the resin to the hardness desired, for example to a hardness comparable to that of soft cast iron.

The finished bearing as shown in Fig. 5 is suited for the various uses above specified.

The thrust bearing illustrated in Fig. 6 is of the same type of construction as of the bearing above described. In this bearing however a shaft 35 is formed with a flange 36. The bearing comprises a metal support 37 carrying a molded fabric of the type above referred to having a vertical annular portion 38 forming a bearing surface for the shaft 35 and having a horizontal ring-shaped flange 39 against which the flange 36 of the shaft 35 rests to constitute the thrust bearing. The bearing support 37 is formed with annular dovetailed grooves 40 and 41 which overlie the ends of the molded fabric bearing member to lock the same securely in place. The molded fabric bearing member of Fig. 6 is similar in composition to the molded fabric bearing member of Fig. 5 with Teflon yarns exposed to form the bearing surfaces of the flanges 38 and 39.

Although a specific embodiment of the invention has been set forth for purposes of illustration it is to be understood that the invention may be applied to various uses and embodied in various forms as will be apparent to a person skilled in the art.

What is claimed is:

A molded fabric bearing for heavy duty high temperature applications, comprising a bearing supporting surface and a molded fabric carried by said surface to form the bearing surface, said fabric having a plurality of layers of filler yarns composed of silicate fibers, warpwise yarns composed of silicate fibers, woven as chains and binding said filler yarns into a unitary structure, such silicate fibers consisting of glass and quartz fibers, and additional warpwise yarns disposed over the surface of said structure and bound under spaced filler yarns, said last warpwise yarns being composed of tetrafluoroethylene and consistuting substantially the entire exposed bearing surface, said fabric being impregnated with a resin capable of bonding with said silicate fibers, said resin being selected from the group consisting of phenolic resins and epoxy resins and being in the state characteristic of having been cured under heat and pressure to form a rigid, molded structure suited for use as a bearing.

References Cited in the file of this patent
UNITED STATES PATENTS

| | | |
|---|---|---|
| 1,986,686 | Stolzenberg | Jan. 1, 1935 |
| 2,804,886 | White | Sept. 3, 1957 |
| 2,862,283 | Rasero | Dec. 2, 1958 |
| 2,885,248 | White | May 5, 1959 |